JOSEPH H. DENIGER, OF BRIDGEPORT, CONNECTICUT.

Letters Patent No. 88,142, dated March 23, 1869.

IMPROVEMENT IN TEMPERING STEEL SPRINGS.

The Schedule referred to in these Letters Patent and making part of the same.

*To all whom it may concern:*

Be it known that I, JOSEPH H. DENIGER, of the city of Bridgeport, in the county of Fairfield, and State of Connecticut, have invented a new and useful Improvement in Tempering Steel Springs for railroad-cars, carriages, &c.; and I do hereby declare that the following is a full, clear, and exact description of the construction and operation of the same.

For first hardening the steel spring, I prepare a compound bath, composed of the following ingredients, or substances, and substantially in the following proportions:

In one barrel of whale, or other animal oil, I put thirty pounds of tallow, and from one to one and a half gallon of spirits of turpentine, and mix them well.

For use, I place this bath near the forge, or tempering-fire, so that when I have heated the steel spring to the proper degree, or temperature, I can remove it to and immerse it in the bath, with the least exposure to the atmosphere; and after the steel has been sufficiently cooled in the bath, without exposure to the air, I return it to the fire, and heat it to such a degree of temperature, that while thus heated, the shape of the spring may be properly corrected, or adjusted, when the proposed spring-temper will be attained.

If I am not ready to shape the spring immediately after cooling it, I allow it to remain in the bath until I am ready, so as not to expose it to the air, for any length of time, from the time it is first heated, until the tempering is complete, and the spring is properly shaped, when, if there is too much heat remaining, it may be again immersed in the bath, to completely cool it, before being generally exposed to the atmospheric air.

When springs are tempered by the common process, the steel is very liable to crack, and many times ten per cent. of the springs are unfit for use; whereas by my process of using the before-described bath, and by preventing the exposure of the steel to the air during the process, much, if not all of this loss will be prevented, and thereby a very great saving will be effected in the manufacture of springs.

What I claim as my invention, and desire to secure by Letters Patent, is—

The mode, method, or process herein described, of tempering steel springs for railroad-cars, carriages, &c.

J. H. DENIGER.

Witnesses:
   HENRY A. KNIGHT,
   R. FITZGERALD.